United States Patent
Baracca et al.

(10) Patent No.: US 11,480,217 B2
(45) Date of Patent: Oct. 25, 2022

(54) BEARING UNIT WITH OPTIMIZED RADIALLY INNER RING

(71) Applicant: Aktiebolaget SKF, Gothenburg (SE)

(72) Inventors: Fausto Baracca, Massa (IT); Andrea A. Bertolini, Carrara (IT); Antonino Calderone, Massa (IT); Giacomo Conti, Montignoso (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/219,048

(22) Filed: Mar. 31, 2021

(65) Prior Publication Data
US 2021/0317876 A1 Oct. 14, 2021

(30) Foreign Application Priority Data
Apr. 9, 2020 (IT) .......................... 102020000007555

(51) Int. Cl.
*F16C 19/06* (2006.01)
*F16C 33/58* (2006.01)

(52) U.S. Cl.
CPC ............ *F16C 33/583* (2013.01); *F16C 19/06* (2013.01)

(58) Field of Classification Search
CPC ...... F16C 19/06; F16C 33/583; F16C 33/585; F16C 35/063; F16C 2240/40; F16C 2240/60
See application file for complete search history.

(56) References Cited

U.S. PATENT DOCUMENTS

| 1,561,443 | A | | 11/1925 | Searles | |
|---|---|---|---|---|---|
| 2,118,885 | A | * | 5/1938 | Hughes | F16C 35/063 384/538 |
| 2,553,337 | A | * | 5/1951 | Shafer | F16C 35/047 411/168 |
| 2,686,088 | A | | 8/1954 | Nelson | |
| 2,739,830 | A | * | 3/1956 | Firth | F16B 21/20 411/929 |
| 3,797,901 | A | * | 3/1974 | Smith | F16C 35/063 384/541 |
| 4,012,086 | A | * | 3/1977 | Kruse | F16C 35/063 403/362 |

(Continued)

FOREIGN PATENT DOCUMENTS

FR  2659404 A1 * 9/1991

OTHER PUBLICATIONS

Search Report for corresponding Italy Patent Application No. 202000007555 dated Dec. 16, 2020.

*Primary Examiner* — Phillip A Johnson
(74) *Attorney, Agent, or Firm* — Reed Smith LLP

(57) ABSTRACT

A bearing unit having a stationary radially outer ring; a radially inner ring rotatable around a central rotation axis (X) of the bearing unit and provided with at least one raceway and, in a terminal portion thereof, with at least one through hole; at least one row of rolling elements interposed between the radially outer ring and the radially inner ring; and at least one clamping element, which is accommodated in the through hole, to lock the radially inner ring on to a rotating shaft. A first radially outer cylindrical surface of the terminal portion of the radially inner ring has a diameter smaller than the diameter of a second radially outer cylindrical surface of a second terminal portion of the radially inner ring.

14 Claims, 1 Drawing Sheet

(56) References Cited

U.S. PATENT DOCUMENTS

| | | | |
|---|---|---|---|
| 4,074,923 A * | 2/1978 | Howe, Jr. | F16D 1/0847 |
| | | | 403/362 |
| 4,229,059 A * | 10/1980 | Dever | F16C 23/084 |
| | | | 384/541 |
| 4,403,814 A * | 9/1983 | Koss | F16D 1/0847 |
| | | | 384/541 |
| 4,472,005 A * | 9/1984 | Norton, II | F16C 35/063 |
| | | | 403/362 |
| 6,092,956 A | 7/2000 | Swinley | |
| 2006/0291764 A1 * | 12/2006 | Ravindra | F16C 35/063 |
| | | | 384/541 |
| 2014/0314363 A1 | 10/2014 | Rocco et al. | |

\* cited by examiner

BEARING UNIT WITH OPTIMIZED RADIALLY INNER RING

CROSS REFERENCE TO RELATED APPLICATIONS

This application is based on and claims priority to Italian Patent Application No. 102020000007555, filed on Apr. 9, 2020, under 35 U.S.C. § 119, the disclosure of which is incorporated by reference herein.

FIELD

The present disclosure relates to a bearing unit provided with elements for clamping the radially inner ring on to a rotating shaft. Such a bearing unit is suitable for applications in the manufacturing sector and especially in the agricultural sector, since it is simple and economical to produce.

BACKGROUND

There are known bearing units provided with rolling elements and systems for clamping the unit on to a rotating shaft.

Bearing units are used to allow the relative movement of a component or assembly with respect to another component or assembly. As a rule, the bearing unit has a first component, for example a radially inner ring, which may be fixed to a second component, for example a rotating shaft, and a third component, for example a radially outer ring, which may be fixed to a fourth component, for example a stationary housing. In different bearing units an inner ring is attached to a stationary component, and an outer ring is attached to a rotating component. Typically, as in the aforementioned examples, the radially inner ring is rotatable, while the radially outer ring is stationary, but in many applications the outer element rotates and the inner element is stationary. In any case, in rolling bearing units, the rotation of one ring with respect to the other is allowed by a plurality of rolling elements that are positioned between the cylindrical surface of one component and the cylindrical surface of the second component, these surfaces usually being called raceways. The rolling elements may be balls, cylindrical or tapered rollers, needle rollers, or similar rolling elements.

BRIEF DESCRIPTION OF THE DRAWINGS

Various embodiments will now be described with reference to the attached drawings, which show some non-limiting examples of embodiment of the housing element, in which.

DETAILED DESCRIPTION

Figure 1:
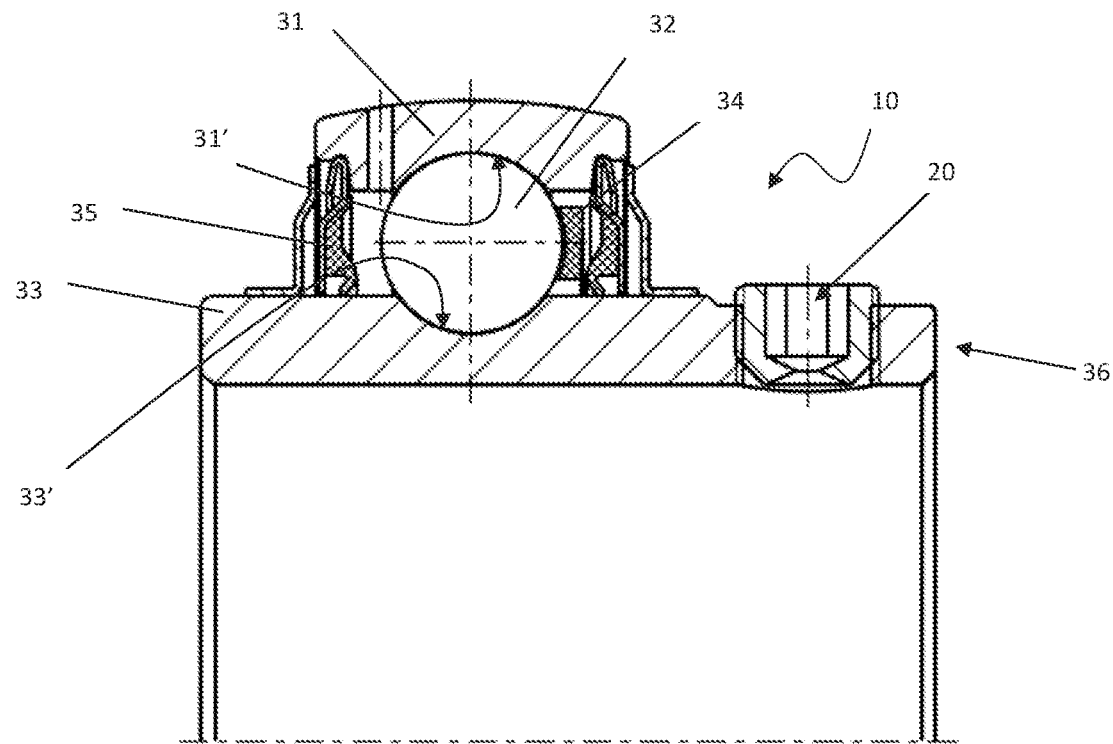
FIG. 1 shows, in cross section, a bearing unit provided with a locking system using headless screws, according to an embodiment of the disclosure.

Bearing units may have clamping elements for mounting on a rotating shaft. These elements may be, for example, a pair of what are called "grub screws", that is to say headless screws, which, when inserted into suitable threaded through holes formed in an axially terminal portion of the radially inner ring, stably lock the radially inner ring on to the shaft. Usually, the two grub screws and their respective holes have an angular spacing of 120°. This solution is simpler and more economical by comparison with the solution providing for the forced interference coupling of the radially inner ring to the rotating shaft, and by comparison with another known solution providing for the use of clamping collars which deform the end portion of the ring by constricting it radially so as to press on the rotating shaft.

Despite its simplicity, this solution has a number of drawbacks. Both the radially outer cylindrical surface and the radially inner cylindrical surface of the radially inner ring of the bearing unit require a precise surface finish which is produced by means of machine grinding. During the process of grinding the diameter of the shoulder (the radially outer surface) of the radially inner ring, grinding machines use a front surface of the radially inner ring as a reference surface, this front surface having already been ground in a preceding process. The diameter of the shoulder is ground by solid profile grinding.

The problem is that, on each revolution of the radially inner ring, the solid profile grinding of the shoulder comes into contact with the threaded holes of the headless screws, of which there are usually two. It has been found that these holes modify the rigidity of the radially inner ring in their cross section and in the surrounding area. This results in a different distribution of the forces exchanged between the grinding and the shoulder on each revolution of the radially inner ring. This asymmetric distribution of the forces, which occurs twice per revolution (that is to say, once for each hole), results in non-uniform grinding of the diameter of the shoulder of the radially inner ring. In the proximity of the cross sections of the holes for the locking screws the forces exchanged are more intense, and consequently the amount of material removed is also greater.

This problem of non-uniform grinding then escalates. This is because, in the subsequent machining, a small surface of the shoulder of the radially inner ring is used as a reference for grinding the hole in the inner ring, in other words in its radially inner cylindrical surface. However, in addition to the problem of asymmetric distribution of forces in the proximity of the threaded holes, the process of grinding the inner hole of the radially inner ring also creates a non-uniform surface in the hole. When roundness checks are carried out on the diameter of the inner hole, it has been found that a shape is seen with two "bumps" spaced at 120° from each other, at the positions of the two threaded holes.

These "bumps" are the direct result of the stronger forces that remove more material in the cross sections of the holes for the locking screws. When roundness that does not meet the permitted tolerances is encountered, this causes a considerable increase in the number of parts rejected by quality control.

Consequently there is a need to design a bearing unit provided with clamping elements for locking the radially inner ring on to a rotating shaft in which the surface finish of the radially inner ring meets the specified tolerances, thus avoiding the problem of a high percentage of rejected parts.

The object of the present disclosure is to provide a bearing unit provided with clamping elements for locking the radially inner ring on to a rotating shaft, comprising a radially inner ring which has two different diameters of the shoulder, that is to say of its radially outer cylindrical surface, and which is consequently free of the drawbacks described above.

According to the present disclosure, the radially inner ring has, in an axially terminal portion (the portion containing the threaded holes for the grub screws), an outside diameter that is different from, and in particular smaller than, the diameter of the remainder of the radially outer cylindrical surface of the radially inner ring, that is to say the surface comprising the raceways of the rolling elements.

The idea is to provide a part of the shoulder with a smaller diameter in the terminal portion of the radially inner ring, where the rigidity is not constant, that is to say near the holes for the headless screws. Thus this surface with a smaller diameter will not be ground by the solid profile grinding. Instead, the ground surface will be that of the shoulder having the larger outside diameter (in other words, the radially outer surface which comprises the raceways), which has a uniformity of material. A precise grinding finish is therefore achieved, so that the same precision will appear in the radially inner cylindrical surface of the radially inner ring. Thus a roundness check on the inner hole of the radially inner ring will yield excellent results, and it will be possible to substantially reduce the rejection of parts during the machining process.

Consequently, a part of the shoulder with a smaller diameter is created, and this solution with two different diameters of the shoulder of the radially inner ring enables rejections to be reduced considerably during the manufacturing process. Thus, according to the present disclosure, a bearing unit is formed, comprising a radially inner ring provided with a shoulder having two different diameters and with the characteristics stated in the attached claims.

An embodiment of a bearing unit according to the present disclosure will now be described, purely by way of example, with reference to the aforesaid figures.

With particular reference to FIG. 1, the bearing unit 10 for applications in the agricultural sector and/or in manufacturing industry—for example, the textile, mining, motor vehicle or food industry—may be interposed, for example, between a rotating shaft and a housing element not forming part of the present disclosure, and comprises:
a stationary radially outer ring 31,
a radially inner ring 33, rotatable about a central axis of rotation X of the bearing unit 10,
at least one row of rolling elements 32, in this example balls, interposed between the radially outer ring 31 and the radially inner ring 33,
a cage 34 for containing the rolling bodies, in order to keep the rolling elements of the row of rolling bodies 32 in position,
clamping elements 20 for locking the radially inner ring on to the shaft.

Throughout the present description and the claims, terms and expressions indicating positions and orientations such as "radial" and "axial" are to be interpreted as relative to the central axis of rotation X of the bearing unit 30.

The radially outer ring 31 is provided with a radially outer raceway 31', while the radially inner ring 33 is provided with at least one radially inner raceway 33' to allow the rolling of the row of rolling elements 32 interposed between the radially outer ring 31 and the radially inner ring 33. For simplicity of illustration, the reference 32 will be applied both to the individual balls and to the row of balls. Also for simplicity, the term "ball" may be used by way of example in the present description and in the attached drawings in place of the more generic term "rolling element" (and the same reference numerals will also be used). Some examples of embodiment and the corresponding designs may provide for the use of rolling elements other than balls (rollers, for example), without thereby departing from the scope of the present disclosure.

The bearing unit 10 is also provided with sealing means 35 for sealing the bearing unit from the external environment. In the following text, the sealing means 35 may be referred to even more simply as seals 35, although this evidently signifies the same component.

As mentioned above, the clamping elements 20, in this example two headless screws placed at 120° to each other, have the function of locking a first portion 36 (or terminal portion) of the radially inner ring 33 on to rotating shaft. These screws pass through corresponding through holes 21 formed in the first portion 36 of the radially inner ring. In the example of FIG. 1, the through holes 21 are threaded, and the headless screws 20 are screwed into the threaded through holes 21. It will be appreciated that while in the exemplary embodiment two headless screws are placed at 120° to each other about the rotational axis, this disclosure is not limited to embodiments with only two screws, or in which screws are placed at 120° to each. Rather the upper limit on the number of screws in an embodiment would depend on the specific dimensions of an embodiment under consideration, e.g., by the particular circumference of the outer surface of the radially inner ring and the dimensions of the screws employed. Suffice to say that in some embodiments, two headless screws placed at 120° to each other provides sufficient locking function.

Figure 2:
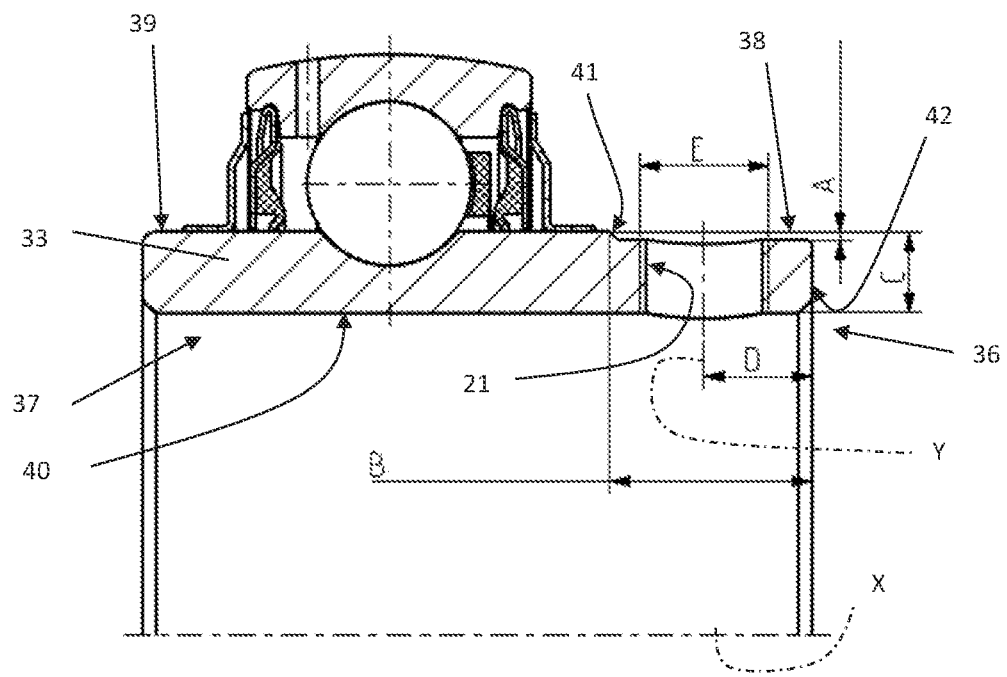
FIG. 2 shows, in cross section, the bearing unit of FIG. 1 without a locking system and with the parameters of a first portion (the terminal portion) of the radially inner ring.

With reference to FIG. 2, an inner ring is shown having been formed having a shoulder of the radially inner ring 33 having two diameters. More precisely, we may identify two portions that form a radially inner ring, namely a first portion 36 that has also been referred to as a terminal portion and that has, e.g., two threaded through holes 21 for the insertion of the headless screws 20, and a remaining second portion 37 comprising at least one raceway 33'. A first portion 36 has a first radially outer cylindrical surface 38, and a second portion 37 has a second cylindrical surface 39 which is also radially outer.

According to the present disclosure, therefore, material is removed from the first portion 36 of the radially inner ring 33, that is to say from the portion comprising the threaded through holes 21, where the rigidity of the radially inner ring is not constant, owing to the presence of the holes. When this is done, the first cylindrical surface 38 will have a diameter different from, and in particular smaller than, the diameter of the second cylindrical surface 39 belonging to the second portion 37 of the radially inner ring 33. It will therefore be possible to grind only the second cylindrical surface 39 of the second portion 37 which has a uniformity of material and therefore enables a high degree of precision to be achieved in machining. The same precision will therefore also be found on the radially inner cylindrical surface 40 of the radially inner ring 33 (in practice, the surface delimiting the inner hole), since said surface will be ground by using the second cylindrical surface 39 as a reference.

Advantageously, better results will be obtained by optimizing the design of the radially inner ring 33.

In particular, a first important geometric parameter is the height A of the step 41 formed between the first cylindrical surface 38 and the second cylindrical surface 39. This height A must be between 5% and 15% of the thickness C of the radially inner ring 33. Larger values of the height A of the step 41 would weaken the first portion 36 excessively in terms of mechanical strength, given that this portion 36 is intended to withstand the load transmitted by the locking screws 20. Smaller values of the height A of the step 41 would render the inventive idea of creating the shoulder with two diameters ineffective, thus adversely affecting the precision of the machine grinding. A preferred value of the height A of the step 41 is equal to 10% of the thickness C of the radially inner ring 33.

A second and equally important geometric parameter is the axial length B of the first portion 36, which is the portion comprising the threaded through holes 21. If D denotes the distance of the axis y of the holes 21 from the front surface 42 of the radially inner ring 33, and E denotes the diameter of the holes 21, the axial length B must be greater than:

D+E/2+1 mm

In practice, the first portion 36 must extend preferably for at least 1 mm beyond the inner edge of the holes 21; otherwise the effect of the non-uniformity of material created by the holes 21 would also partly extend to the second portion 37, thus adversely affecting the quality of the machine grinding on the second cylindrical surface 39. In some embodiments, the first portion 36 extends about 1 mm beyond the inner edge of the holes 21. In other embodiments the first portion 36 extends more than 1 mm beyond the inner edge of the holes 21.

Thus, by forming a shoulder with two different diameters on the radially inner ring 33, and preferably by following the design rules set out above, a precision ground finish will be obtained both on the second cylindrical surface 39 and on the radially inner cylindrical surface 40 of the radially inner ring. The subsequent quality control, particularly the check on the roundness of the inner hole of the radially inner ring, will yield excellent results, and the rejection of parts during the machining process can be substantially reduced, by about 50%.

In some embodiments a method is performed to form an inner ring in accordance with this disclosure. In the method a first portion of an inner ring includes one or more through holes is grind formed to a first thickness and a second portion of the inner ring is formed to a second thickness greater than the first thickness. In preferable embodiments of the method, the second portion does not include through holes.

In addition to the embodiments of the disclosure as described above, it is to be understood that numerous other variants exist. It is also to be understood that said embodiments are provided solely by way of example and do not limit the object of the disclosure or its applications or its possible configurations. On the contrary, although the description given above enables those skilled in the art to implement the present disclosure according to at least one example of its configurations, it is to be understood that numerous variations of the components described may be envisaged without thereby departing from the object of the disclosure as defined in the appended claims, interpreted literally and/or according to their legal equivalents.

What is claimed is:

1. A bearing unit comprising:
   a stationary radially outer ring;
   a radially inner ring configured to be rotatable around a central rotation axis (X) of the bearing unit, wherein the radially inner ring is provided with at least one raceway, and, in a first portion thereof, at least one through hole;
   at least one row of rolling elements interposed between the radially outer ring and the radially inner ring; and
   at least one clamping element provided in the at least one through hole, wherein the at least one clamping element is configured to lock the radially inner ring on a rotating shaft;
   wherein a first cylindrical surface radially external of the first portion of the radially inner ring has a diameter smaller than a diameter of a second cylindrical surface radially external of a second portion of the radially internal ring,
   wherein between the first cylindrical surface and the second cylindrical surface of the radially inner ring there is a step whose height (A) is comprised between 5% and 15% of a thickness (C) of the radially inner ring.

2. The bearing unit according to claim 1, wherein the height (A) of the step is exactly equal to 10% of the thickness (C) of the radially inner ring.

3. The bearing unit according to claim 2, wherein the first portion of the radially inner ring has an axial length (B) greater than:

D+E/2+1 mm wherein
D is the distance of an axis (y) of the at least one through hole from a front surface of the radially inner ring; and
E is the diameter of the at least one through hole.

4. The bearing unit according to claim 3, wherein the at least one clamping element is configured as two headless screws angularly distant from each other by 120° and the at least one through hole is configured as two corresponding threaded through holes.

5. The bearing unit according to claim 2, wherein the at least one clamping element is configured as two headless screws angularly distant from each other by 120° and the at least one through hole is configured as two corresponding threaded through holes.

6. The bearing unit according to claim 1, wherein the first portion of the radially inner ring has an axial length (B) greater than:

D+E/2+1 mm wherein
D is the distance of an axis (y) of the at least one through hole from a front surface of the radially inner ring; and
E is the diameter of the at least one through hole.

7. The bearing unit according to claim 6, wherein the at least one clamping element is configured as two headless screws angularly distant from each other by 120° and the at least one through hole is configured as two corresponding threaded through holes.

8. The bearing unit according to claim 1, wherein the at least one clamping element is configured as two headless screws angularly distant from each other by 120° and the at least one through hole is configured as two corresponding threaded through holes.

9. A bearing unit comprising:
   a stationary radially outer ring;
   a radially inner ring configured to be rotatable around a central rotation axis (X) of the bearing unit, wherein the radially inner ring is provided with at least one raceway, and, in a first portion thereof, at least one through hole;
   at least one row of rolling elements interposed between the radially outer ring and the radially inner ring; and
   at least one clamping element provided in the at least one through hole, wherein the at least one clamping element is configured to lock the radially inner ring on a rotating shaft;
   wherein a first cylindrical surface radially external of the first portion of the radially inner ring has a diameter smaller than a diameter of a second cylindrical surface radially external of a second portion of the radially internal ring, wherein the first portion of the radially inner ring has an axial length (B) greater than:

$$D+E/2+1 \text{ mm}$$

wherein

D is the distance of an axis (y) of the at least one through hole from a front surface of the radially inner ring; and E is the diameter of the at least one through hole.

10. The bearing unit according to claim 9, wherein the at least one clamping element is configured as two headless screws angularly distant from each other by 120° and the at least one through hole is configured as two corresponding threaded through holes.

11. A radially inner ring configured to be rotatable around a central rotation axis (X) of the bearing unit, comprising:
- at least one raceway;
- a first portion defining at least one through hole;
- a first cylindrical surface defined by a radially external surface of the first portion of the radially inner ring; and
- a second cylindrical surface defined by a radially external surface of a second portion of the radially inner ring having a second diameter greater than a first diameter defined by the first cylindrical surface,
- wherein between the first cylindrical surface and the second cylindrical surface of the radially inner ring there is a step whose height (A) is comprised between 5% and 15% of a thickness (C) of the radially inner ring.

12. The radially inner ring according to claim 11, wherein the height (A) of the step is exactly equal to 10% of the thickness (C) of the radially inner ring.

13. The radially inner ring according to claim 12, wherein the first portion of the radially inner ring has an axial length (B) greater than:

$$D+E/2+1 \text{ mm}$$

wherein

D is the distance of an axis (y) of the at least one through hole from a front surface of the radially inner ring; and E is the diameter of the at least one through hole.

14. A radially inner ring configured to be rotatable around a central rotation axis (X) of the bearing unit, comprising:
- at least one raceway;
- a first portion defining at least one through hole;
- a first cylindrical surface defined by a radially external surface of the first portion of the radially inner ring; and
- a second cylindrical surface defined by a radially external surface of a second portion of the radially inner ring having a second diameter greater than a first diameter defined by the first cylindrical surface,
- wherein the first portion of the radially inner ring has an axial length (B) greater than:

$$D+E/2+1 \text{ mm}$$

wherein

D is the distance of an axis (y) of the at least one through hole from a front surface of the radially inner ring; and E is the diameter of the at least one through hole.

\* \* \* \* \*